(12) United States Patent
Jayr et al.

(10) Patent No.: US 9,751,180 B2
(45) Date of Patent: Sep. 5, 2017

(54) INSERT HOLDER FOR A MACHINE TOOL

(71) Applicant: Centre Technique de L'Industrie du Decolletage, Cluses (FR)

(72) Inventors: Cyril Jayr, Saint Sixt (FR); Patrice Laurent, Viuz en Sallaz (FR); Roger Busi, Saint Laurent (FR)

(73) Assignee: Centre Technique de L'Industrie du Decolletage, Cluses (FR)

( * ) Notice: Subject to any disclaimer, the term of this patent is extended or adjusted under 35 U.S.C. 154(b) by 96 days.

(21) Appl. No.: 14/779,699

(22) PCT Filed: Mar. 21, 2014

(86) PCT No.: PCT/EP2014/055762
§ 371 (c)(1),
(2) Date: Sep. 24, 2015

(87) PCT Pub. No.: WO2014/154593
PCT Pub. Date: Oct. 2, 2014

(65) Prior Publication Data
US 2016/0045994 A1 Feb. 18, 2016

(30) Foreign Application Priority Data
Mar. 25, 2013 (FR) ..................................... 13 52674

(51) Int. Cl.
*B23Q 17/09* (2006.01)
*B23B 29/04* (2006.01)
(Continued)

(52) U.S. Cl.
CPC ........ *B23Q 17/0966* (2013.01); *B23B 27/007* (2013.01); *B23B 29/04* (2013.01);
(Continued)

(58) Field of Classification Search
CPC . B23B 2260/128; B23B 27/007; B23B 29/04; B23B 29/12; B23Q 17/0966;
(Continued)

(56) References Cited

U.S. PATENT DOCUMENTS 4,555,955 A * 12/1985 Morgan .................. G01L 5/161
73/794
6,925,915 B1 * 8/2005 Claesson ................. B23B 25/02
82/133
(Continued)

FOREIGN PATENT DOCUMENTS

| DE | 42 33 774 A1 | 4/1994 |
| EP | 2 051 041 A2 | 4/2009 |
| WO | WO 02/45891 A1 | 6/2002 |

OTHER PUBLICATIONS

International Search Report of the ISA for Appl. No. PCT/EP2014/055762 dated Jun. 23, 2014; 5 pages.

*Primary Examiner* — Daniel Howell
*Assistant Examiner* — Nicole N Ramos
(74) *Attorney, Agent, or Firm* — Daly, Crowley, Mofford & Durkee, LLP (57) ABSTRACT

The invention relates to an insert holder for a tool for turning a machine tool, comprising an insert holder body (2), the head (22) of which is intended to receive a cutting insert (3), characterized in that at least two measurement recesses (4, 5) are provided in the insert holder body (2) on the side of the head (22), said measurement recesses (4, 5) being arranged symmetrically relative to the neutral fiber (6) of the insert holder body (2) and centered on the neutral fiber (6). The measurement recesses (4, 5) have, respectively, a planar bottom (41, 51) that is parallel to the direction (Y) of the component of the tangential cutting force of the insert holder to be measured, and parallel to the longitudinal direction (X, Z) of the insert holder body (2). The insert holder also
(Continued)

comprises at least one first strain gauge (71, 72, 73, 74) configured such as to measure the change in shape of the planar bottom (41, 51) of at least one of the measurement recesses (4, 5).

19 Claims, 10 Drawing Sheets (51) Int. Cl.
*G01B 7/16* (2006.01)
*G01L 5/00* (2006.01)
*G01L 5/16* (2006.01)
*B23B 27/00* (2006.01)
*B23B 29/12* (2006.01)

(52) U.S. Cl.
CPC ............... *B23B 29/12* (2013.01); *G01B 7/16* (2013.01); *G01B 7/18* (2013.01); *G01L 5/0061* (2013.01); *G01L 5/161* (2013.01); *B23B 2260/128* (2013.01); *Y10T 82/2595* (2015.01); *Y10T 408/76* (2015.01); *Y10T 409/304312* (2015.01)

(58) Field of Classification Search
CPC ............... Y10T 408/76; Y10T 82/2595; Y10T 82/2585; Y10T 409/304312
See application file for complete search history.

(56) References Cited

U.S. PATENT DOCUMENTS 7,340,985 B2 * 3/2008 Claesson ............... B23B 27/002
173/162.1
7,647,853 B2 * 1/2010 Lundblad ............... B23B 27/002
408/143

\* cited by examiner

INSERT HOLDER FOR A MACHINE TOOL

CROSS REFERENCE TO RELATED APPLICATIONS

This application is a U.S. National Stage of PCT application PCT/EP2014/055762 filed in the French language on Mar. 21, 2014, and entitled "INSERT HOLDER FOR A MACHINE TOOL," which claims priority to French application FR1352674 filed Mar. 25, 2013 which application is incorporated herein by reference.

The present invention concerns an insert holder for a machine tool turning tool. The turning tool is for example intended for exterior turning operations such as plain turning, facing, contour milling, thread-cutting, grooves/parting off or multidirectional turning operations for grooves or plain turning. The turning tool is for example intended for interior turning operations such as boring, interior contour milling, thread-cutting or grooves.

Machining processes need to evolve constantly because of increasing productivity, machining quality constraints linked for example to the surface state of the machined parts and the evolution of the materials of the parts to be machined. In order to comply with new criteria in respect of required performance, methodologies aiming to optimize cutting conditions have been developed. Thus there is known the industrial tool-material combination (COM) concept defined by French standard NFE 66-520 for selecting the cutting parameters such as the advance, pass depth or cutting speed of the tools in the material to be machined.

The above standard requires the machining conditions to be appropriate to a tool and machined material combination and a study of the evolution of the cutting output parameters, such as the shape of the chips, the cutting forces or the power of the machine tool spindle, to enable determination of a range of use that is the optimum in terms of cutting conditions.

One possible way of monitoring the cutting output parameters consists in measuring the variations in the electrical power absorbed by the spindle of the machine tool. This can be measured in the conventional way by a wattmeter type sensor. However, certain machining operations such as finishing or semi-finishing operations require machining forces that are too low for the power variations to be measured reliably and accurately by these sensors.

Another possibility consists in measuring the cutting forces exerted on the insert holder. For this there are known force measurement cards utilizing piezoelectric sensors sensitive to the surface deformations of the insert holder. Various piezoelectric dynamometers make it possible to measure forces, notably in three directions in space, with satisfactory accuracy, even for operations necessitating low machining forces. However, these sensors can be very costly and impossible to install in certain machine tools.

One object of the present invention is to propose an insert holder for machine tools able to measure cutting forces with good sensitivity, even for finishing or semi-finishing operations, and that is not too costly.

To this end, the invention proposes an insert holder for a machine tool turning tool including an insert holder body the head of which is intended to receive a cutting insert, characterized in that at least two measurement cavities are formed in the insert holder body at the head end, said measurement cavities being symmetrically arranged relative to the neutral fiber of the insert holder body and centered on the neutral fiber, each of the measurement cavities having a respective flat bottom parallel to the direction of the component of the tangential cutting force of the insert holder to be measured and parallel to the longitudinal direction of the insert holder body, the insert holder further including at least one first strain gage configured to measure the deformation of the flat bottom of at least one of the two measurement cavities.

In all exterior turning operations (plain turning, facing, contour milling, thread-cutting, grooves/parting off or multidirectional turning operations for grooves or plain turning) or interior turning operations (boring, interior contour milling, thread-cutting or grooves), the direction of the component of the tangential cutting force of the insert holder (or main cutting force) is orthogonal to the plane defined by the cutting insert.

Because of the asymmetry of the position of the cutting insert, the cutting force primarily deforms the insert body in shear. The cutting force exerted on the insert holder can be evaluated by measuring the deformations in shear of the insert holder body parallel to the direction of the component of the tangential cutting force to be measured and parallel to the longitudinal direction of the insert holder body. The first strain gages being arranged at the bottom of the measurement cavities, they are as close as possible to the neutral fiber of the insert holder so that the influence of the insert holder advance, torsion and penetration forces is limited, the measurement primarily reflecting the deformations induced by the tangential cutting force.

The measurement cavities locally reduce the thickness of the core of the insert holder body in the region in which the first strain gages are arranged. This makes the insert holder body more flexible, which enables amplification at this location of the deformations of the insert holder body and therefore improvement of the accuracy of the measurements without reducing the strength of the insert holder. Moreover, the forces can therefore be measured accurately by an insert holder enabling the use of standard commercially available cutting inserts without modifications.

The thickness of the core of the insert holder body between the respective flat bottoms of the measurement cavities is between 2 and 10 millimeters, for example, and the longitudinal dimension of the measurement cavity is between 8 and 22 millimeters. For example, the ratio e/D between the thickness e of the core of the insert holder body and the longitudinal dimension D of the measurement cavity is between 0.1 and 0.85.

To be more precise, the thickness of the core of the insert holder body between the respective flat bottoms of the measurement cavities is between 4 and 8 millimeters, for example, and the longitudinal dimension of the measurement cavity is between 10 and 20 millimeters. For example, the ratio e/D between the thickness e of the core of the insert holder body and the longitudinal dimension D of the measurement cavity is between 0.3 and 0.5.

The thickness of the core of the insert holder body and the longitudinal dimension of the measurement cavities determine the stiffness of the insert holder body. The ratio must be a good compromise between a core thickness of the insert holder body that is too low, which would introduce the risk of the insert holder vibrating, and a core thickness of the insert holder body that is too great, which would reduce the sensitivity of the measurements. The wall on either side of the measurement cavities is then relatively thin, which also makes it possible to minimize the influence of flexing linked to the advance force.

The insert holder includes at least four first strain gages connected in a complete Wheatstone bridge, for example, the first strain gages connected in the opposite branches of the Wheatstone bridge being arranged in a separate measurement cavity and being superposed on respective opposite sides of the core of the insert holder body. This wiring makes it possible to limit the influence of the deformations of the insert holder linked to the advance, torsion or penetration force on the measurement of the tangential cutting force.

The first strain gages are associated in pairs, for example, to measure the deformation of the flat bottom by forming a double "Christmas tree" gage for which the longitudinal directions of the resistive wires of the respective two first strain gages are arranged in a "V", said resistive wires being substantially centered relative to the neutral fiber and aligned on the neutral fiber. These Christmas tree gages being sensitive only to shear, this limits the influence of the other deformations on the measurement of the tangential cutting force. This notably limits insert holder torsion forces caused by the asymmetrical position of the cutting insert.

In accordance with one particular embodiment, the insert holder body also includes at least one plane lateral wall perpendicular to the direction of the component of the cutting force of the insert holder, the insert holder further including at least one second strain gage configured to measure the deformation of at least one plane lateral wall. It is therefore possible to measure forces of other types, such as a plain turning advance force or a facing penetration force, independently of the measurement of the tangential cutting force.

The plane lateral walls are formed in lateral walls of the measurement cavities, for example. Two measurement cavities are therefore necessary rather than four.

For example, the insert holder includes at least four second strain gages connected in a complete Wheatstone bridge, the second strain gages connected in opposite branches of the Wheatstone bridge being arranged facing one another in the direction of the component of the tangential cutting force of the insert holder and configured to measure a plane lateral wall. With this particular wiring, it is possible to measure forces of other types exerted only on the insert holder, such as a plain turning advance force or a facing penetration force, limiting the influence of the tangential cutting or torsion forces.

In accordance with another particular embodiment, the insert holder includes:
  two additional measurement cavities in the insert holder body having at least one respective flat bottom aligned with and offset longitudinally from the flat bottom of the measurement cavities, and
  at least one third deformation sensor configured to measure the deformation of at least one flat bottom of a measurement cavity and the deformation of at least one flat bottom of an additional measurement cavity.

For example, a plain turning penetration force can therefore be measured independently of the measurement of the tangential cutting force.

The insert holder may include at least one closure plate for closing and sealing the measurement cavities. The closure plates make it possible to protect the strain gages, notably from oil splashes or chips.

An internal duct connected to the measurement cavities may be formed in the insert holder body for the connecting wires of the strain gage(s), said internal duct opening onto the end of the insert holder body. The strain gage connections are therefore protected in the insert holder body and the insert holder includes only one output cable for the connection to a measurement acquisition device.

Other objects, advantages and features will become apparent on reading the description of the invention and from the appended drawings, in which.

In these figures, identical elements bear the same reference numbers. In the remainder of the description, there are adopted by way of nonlimiting example longitudinal, transverse and vertical directions indicated in this figure by the trihedron (X, Y, Z) fixed relative to the insert holder.

For all exterior or interior turning operations:
  the axis Y is parallel to the vertical direction of the component of the tangential cutting force of the insert holder (or main cutting force), orthogonal to the plane (X, Z) defined by the cutting insert, and the axis Z is parallel to the rotation axis of the part to be machined.

In exterior turning, the axis X corresponds to the direction parallel to the main longitudinal direction of the insert holder body.

In plain turning (exterior turning), the axis X is parallel to the direction of the component of the insert holder penetration force and the axis Z is parallel to the direction of the component of the insert holder advance force.

In facing (exterior turning), the axis X is parallel to the direction of the component of the insert holder advance force and the axis Z is parallel to the direction of the component of the insert holder penetration force.

In interior turning, the axis Z parallel to the rotation axis of the part to be machined is parallel to the main longitudinal direction of the insert holder body. The axis Z can be parallel to or perpendicular to the direction of the component of the insert holder advance force.

The invention concerns an insert holder 1 intended to be mounted in a tool holder for a turning tool itself intended to be mounted in a machine tool.

The turning tool is intended for exterior turning operations, for example, such as plain turning, facing, contour milling, thread-cutting, grooves/parting off or multidirectional turning operations for grooves or plain turning. The turning tool may also be intended for interior turning operations such as boring, interior contour milling, thread-cutting or grooves.

Figure 1:
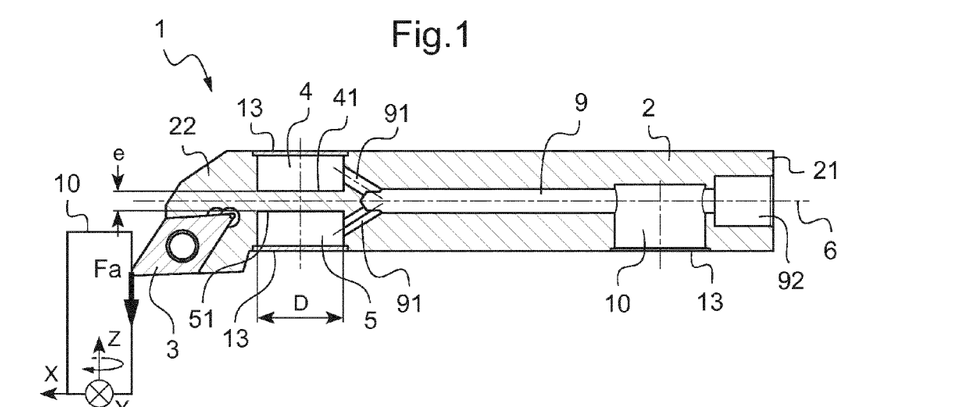
FIG. 1 shows a sectional top view of a first embodiment of an insert holder for a plain turning tool and a part to be machined.

FIG. 1 shows a first embodiment of the insert holder 1.

The insert holder 1 includes an insert holder body 2 having a holding portion 21 and a head 22. The insert holder body 2 is made of stainless steel, for example. The holding portion 21 is of rectangular parallelepiped general shape, for example, and has a square cross section, for example.

The head 22 is intended to receive a cutting insert 3 for machining a part 10. The cutting insert 3 is fixed to one end of the head 22. The cutting insert 3, which has a rhomboid shape in the FIG. 1 example, is fixed to the insert holder body 2 in the conventional way, for example brazed to it or mounted on it in a removable manner. The insert holder body 2 is therefore asymmetrical, notably because of the position of the cutting insert 3 and the shape of the head 22.

Two measurement cavities 4, 5 are produced in the insert holder body 2 at the head 22 end. To be more precise, the measurement cavities 4, 5 are formed in the symmetrical holding portion 21 of the insert holder body 2, as close as possible to the head 22, so as to be situated as close as possible to the cutting insert 3.

The measurement cavities 4, 5 are arranged symmetrically relative to the neutral fiber 6 of the insert holder body 2. They are centered on the neutral fiber 6, i.e. they are themselves symmetrically arranged relative to the neutral fiber 6.

During machining, a number of forces are exerted on the insert holder 1: notably the tangential cutting force Fc, the advance force Fa, the penetration force and the torsion forces.

For a plain turning operation as shown in FIG. 1, the deformation along the axis Y is primarily caused by a flexing Fc that is the main effect of the cutting force exerted on the insert holder. It is this flexing Fc or tangential cutting force that is primarily to be determined accurately in order to optimize the cutting parameters.

In plain turning, the deformation along the axis Z is primarily caused by the advance force Fa (FIG. 1).

In plain turning, the deformation along the axis X is primarily linked to the force of penetration of the cutting insert 5 into the part to be machined.

According to beam theory, the neutral fiber 6 is an imaginary mean curve that extends in the longitudinal direction of the insert holder 1 and passes through the center of gravity of the cross sections of the holding portion 21 of the insert holder body 2.

The measurement cavities 4, 5 have respective flat bottoms 41, 51 in the plane (X, Y) parallel to the vertical direction Y of the component of the tangential cutting force of the insert holder 1 that is to be measured and parallel to the longitudinal direction X of the insert holder body 2.

The insert holder 1 further includes at least one first strain gage 7 configured to measure the deformation of the flat bottom 41, 51 of at least one of the two measurement cavities 4, 5. The resistive wires of the strain gages that are subjected to extension or compression are deformed, converting a mechanical deformation into a variation of electrical resistance. The strain gages therefore make it possible to measure deformations with good accuracy, at lower cost, and are easy to arrange because it suffices to stick them to the plane surfaces the deformation whereof is to be measured.

Figure 4:
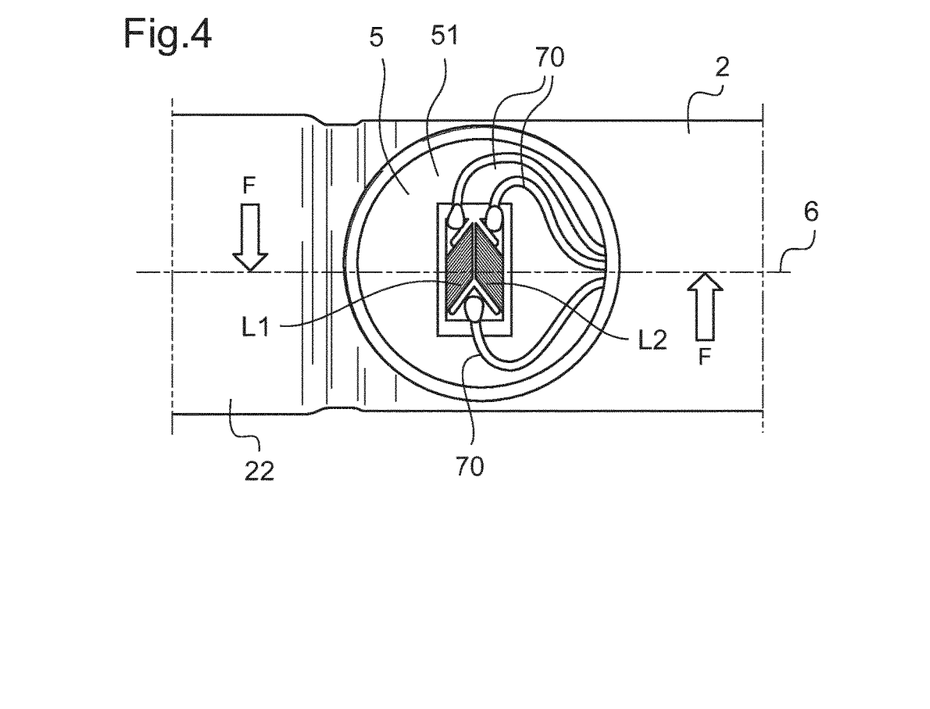
FIG. 4 shows a partial perspective side view of an insert holder with no closure plate.

Because of the asymmetry of the insert holder, the tangential cutting force primarily deforms the insert body in shear (the shear is shown by the arrows F in FIG. 4). Measuring the deformations in shear of the insert holder body 2 parallel to the vertical direction Y of the component of the tangential cutting force to be measured enables evaluation of the tangential cutting force exerted on the insert holder 1.

The first strain gages being arranged at the bottom of the measurement cavities 4, 5, the latter are as close as possible to the neutral fiber 6 of the insert holder 1 so that the influence of the insert holder advance, torsion and penetration forces is limited, the measurement primarily reflecting the deformations caused by the tangential cutting force.

The measurement cavities 4, 5 locally reduce the thickness e of the core of the insert holder body 2 in the region in which the first strain gages are arranged. This thinning makes the insert holder body 2 more flexible, which enables amplification at this location of the deformations of the insert holder body 2 and therefore improvement of the accuracy of the measurements without reducing the strength of the insert holder. Moreover, the forces can be measured accurately using standard commercially available cutting inserts with no modifications.

Figure 3:
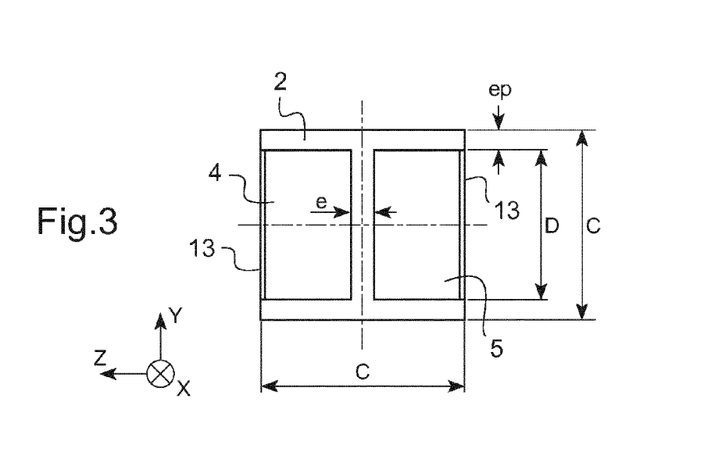
FIG. 3 shows a sectional front view of a cross section of an insert holder body on the axis X.
Figure 5:
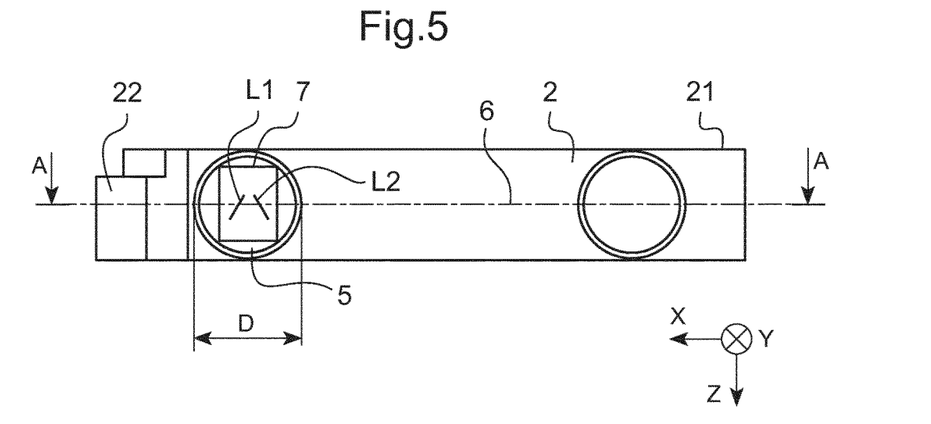
FIG. 5 shows a side view of the insert holder from FIG. 1 with no cutting insert and no closure plate.

The thickness e of the core of the insert holder body 2 between the respective flat bottoms 41, 51 of the measurement cavities 4, 5 is between 4 and 8 millimeters, for example (FIGS. 1, 3 and 5). The longitudinal dimension D of the measurement cavities 4, 5 in the longitudinal direction X is between 10 and 20 millimeters, for example.

Consider by way of example an insert holder body 2 of rectangular parallelepiped general shape having a square cross section and measurement cavities 4, 5 having a cylindrical general shape. The axis of the cylindrical measurement cavities 4, 5 (or their height) extends in a direction parallel to the rotation axis Z.

For a square cross section of the insert holder body 2 having a side length C of the order of 12 millimeters, the thickness e of the core of the insert holder body 2 is of the order of 4 millimeters, for example, and the diameter D of the measurement cavities 4, 5 is of the order of 10.5 millimeters for an insert holder having a length of 80 millimeters. The ratio e/D between the thickness e of the core of the insert holder body and the longitudinal dimension D of the measurement cavity is then of the order of 0.38.

For a square section of the insert holder body 2 having a side length C of the order of 16 millimeters, the thickness e of the core of the insert holder body 2 is of the order of 6 millimeters, for example, and the diameter D of the measurement cavities 4, 5 is of the order of 13.5 millimeters for an insert holder having a length of 100 millimeters. The ratio e/D between the thickness e of the core of the insert holder body and the longitudinal dimension D of the measurement cavity is then of the order of 0.44.

For a square section of the insert holder body 2 having a side length C of the order of 25 millimeters, the thickness e of the core of the insert holder body 2 is of the order of 8 millimeters, for example, and the diameter D of the measurement cavities 4, 5 is of the order of 20 millimeters for an insert holder having a length of 150 millimeters. The ratio e/D between the thickness e of the core of the insert holder body and the longitudinal dimension D of the measurement cavity is then of the order of 0.4.

The ratio between the thickness e of the core of the insert holder body 2 and the length D of the longitudinal dimension of the measurement cavities 4, 5 determine the stiffness of the insert holder body, which must be a good compromise between too small a thickness e of the core of the insert holder body 2 risking vibration of the insert holder 1 and too great a thickness of the core of the insert holder body 2 reducing the sensitivity of the measurements. The thickness ep in the longitudinal direction X of the wall on either side of the measurement cavities 4, 5 is then relatively small (between 0.75 and 2.5 millimeters), which also makes it possible to minimize the influence of the flexing linked to the advance force.

The insert holder 1 includes a single first strain gage 7 arranged in a measurement cavity 4, for example.

Figure 6A:
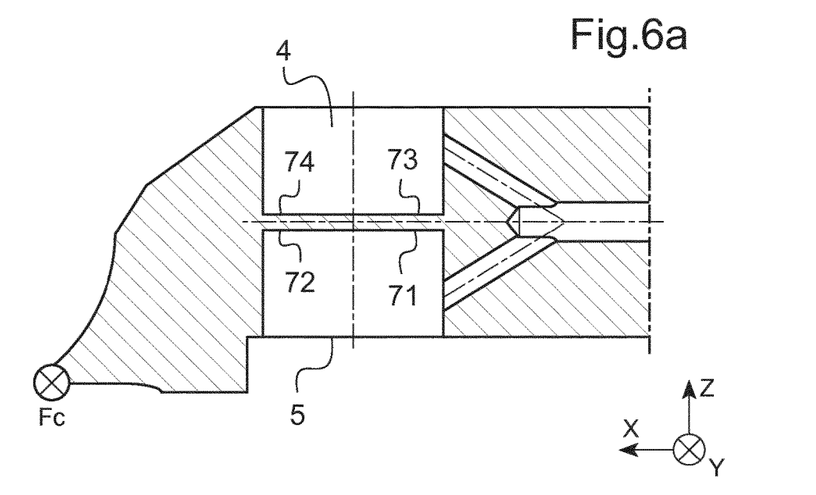
FIG. 6a shows a diagrammatic part-sectional top view of an insert holder on which first strain gages are located and the direction of a tangential cutting force exerted on the insert holder.

For improved accuracy, the insert holder 1 includes two first strain gages 71, 72, 73, 74 in each measurement cavity (see FIG. 6a).

An internal duct 9 for the connecting wires 70 of the first strain gages 71, 72, 73, 74 is connected to the measurement cavities 4, 5 in the insert holder body 2.

The internal duct 9 extends longitudinally in the insert holder body 2 between an inlet 91 with two "Y" branches connecting the measurement cavities 4, 5 and an outlet 92 opening onto the end of the insert holder body 2 (see FIG. 1). A wiring cavity 10 is also provided in the holding portion 21 of the insert holder body 2 between the inlet 91 with two branches and the outlet 92 of the internal duct 9. The wiring cavity 10 enables connection of the connecting wires 70 of the first strain gages 71, 72, 73, 74 to an output cable 73 when mounting the gages. The strain gage connections are therefore protected in the insert holder body 2 and the insert holder 1 includes only one output cable 73 for the connection to a measurement acquisition device.

Double strain gages known as "chevron" or "Christmas tree" gages are used, for example, as shown in FIGS. 4 and 5. A Christmas tree gage includes two strain gages the irrespective longitudinal directions L1, L2 of which intersect in a "V" defining an angle between 80 and 100°, for example, such as an angle of 90°, for example. Because of the slantwise orientation of the resistive wires, the Christmas tree gage is sensitive to shear deformations (see FIG. 4), which limits the influence of the other deformations on the measurement of the tangential cutting force.

The Christmas tree gages are arranged on the respective flat bottom 41, 51, over the projection of the neutral fiber 6, so as to limit the influence in particular of torsion forces of the insert holder caused by the asymmetric position of the cutting insert 3. The Christmas tree gages are substantially centered and aligned on this projection, for example.

Figure 6B:
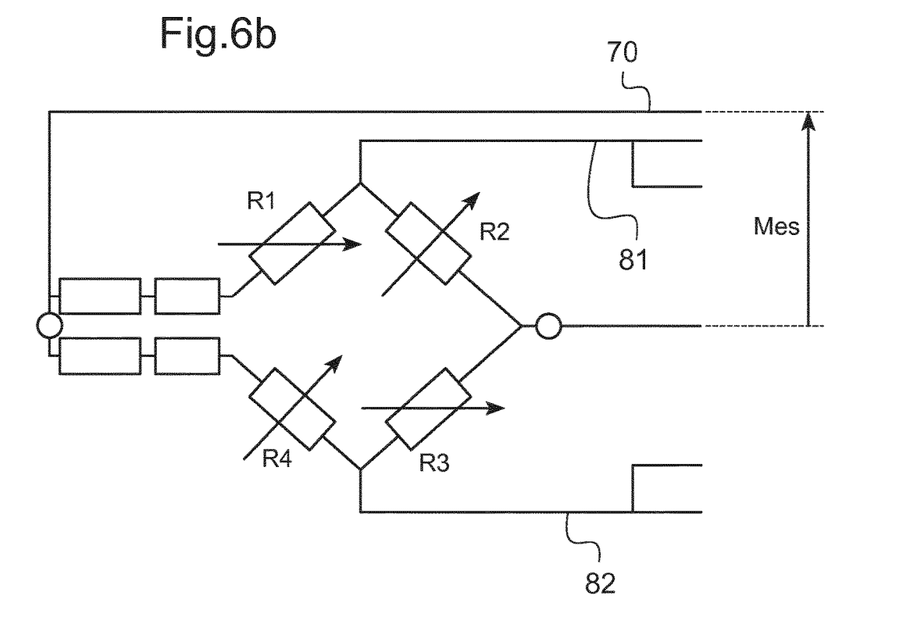
FIG. 6b shows an example of the wiring of the first strain gages of the insert holder from FIG. 6a in which are shown variations of resistance and the imbalance of the Wheatstone bridge because of the effect of flexing caused by a tangential cutting force.

To limit the influence of forces other than the tangential cutting force, the first strain gages 71, 72, 73, 74 are also wired into a complete Wheatstone bridge (see FIG. 6b).

As shown in FIG. 6a, for example, a first Christmas tree gage 71, 72 is arranged in a first measurement cavity 5 and a second Christmas tree gage 73, 74 is arranged in a second measurement cavity 4.

The Christmas tree gages 71, 72 and 73, 74 are superposed on respective opposite sides of the core of the insert holder body 2 so that the orientation of the resistive wires of the Christmas tree gages is substantially superposed.

The first strain gages 71, 73 connected in opposite branches of the Wheatstone bridge are therefore arranged in a separate measurement cavity 4, 5 and are superposed on respective opposite sides of the core of the insert holder body 2. Similarly, the first strain gages 72, 74 connected in opposite branches of the Wheatstone bridge are arranged in a separate measurement cavity 4, 5 and are superposed on respective opposite sides of the core of the insert holder body 2.

To be more precise, the junction between the two resistances R1 and R2 of the first strain gages 71, 72 of the first Christmas tree gage arranged in the first measurement cavity 5 are connected to a first power supply terminal 81. The junction between the two resistances R3 and R4 of the first strain gages 73, 74 of the second Christmas tree gage arranged in the second measurement cavity 4 are connected to a second power supply terminal 82.

The measurement is effected between the junction between the resistance R1 of the first Christmas tree gage and the resistance R4 of the second Christmas tree gage and between the junction between the resistance R2 of the first Christmas tree gage and the resistance R3 of the second Christmas tree gage.

The resistances R1, R2, R3, R4 of the four strain gages 71, 72, 73, 74 all have substantially the same value so that, at balance, the Wheatstone bridge has a null measurement voltage Mes when it is supplied with power by a voltage source between the power supply terminals 81, 82. In other words, R1*R3=R2*R4.

Shown in FIG. 6a is a tangential cutting force Fc exerted on the insert holder 1. The tangential cutting force Fc applies a vertical thrust to the cutting insert 3 perpendicular to the plane (X, Z) defined by the cutting insert 3.

It is above all the resistive wires of the strain gages 72 and 74 arranged at the front of the insert holder 1 nearest the head 22 that are subjected to the deformations in shear of the insert holder 1.

The unbalanced Wheatstone bridge is shown diagrammatically in FIG. 6b. Assuming that on stretching the resistance of the resistive wires increases and vice versa, the deformations of the strain gages 72 and 74 arranged at the front one below the other in a respective measurement cavity 4, 5 increase the two resistances R2 and R4 connected to opposite branches of the Wheatstone bridge. The deformation of the strain gages 71 and 73 arranged farther to the rear on the insert holder body 2 is smaller. Therefore R1*R3<R2*R4. The imbalance of the Wheatstone bridge causes a non-null output voltage Mcs to appear that is representative of the tangential cutting force.

Figure 7A:
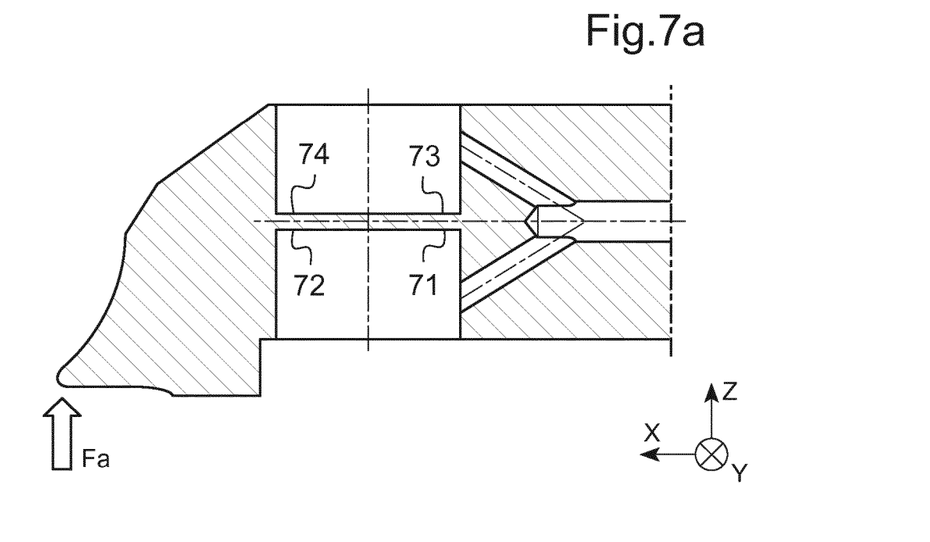
FIG. 7a is a view similar to FIG. 6a showing the direction of an advance force exerted on the insert holder body.

Shown in FIG. 7a is an advance force Fa simultaneous with the tangential cutting force Fc. The advance force Fa applies a transverse thrust to the cutting insert 3 perpendicular to the longitudinal direction X of the insert holder 1 and coplanar with the plane (X, Z) defined by the cutting insert 3.

The first strain gages 73 and 74 arranged in the second measurement cavity 4 of the insert holder 1 are deformed in compression, reducing the two resistances R3 and R4, respectively. The first strain gages 71 and 72 arranged in the first measurement cavity 5 of the insert holder 1 are deformed in extension, increasing the two adjacent resistances R1 and R2, respectively.

The reduction of the resistances R3 and R4 in the second measurement cavity 4 is substantially equal to the increase of the resistances R1 and R2 in the first measurement cavity 5. Thus the relation R1\*R3=R2\*R4 substantially remains applicable. Consequently, the deformation of the insert holder linked to the flexing force caused by the advance movement hardly imbalances the Wheatstone bridge at all (see FIG. 7b).

Figure 7B:
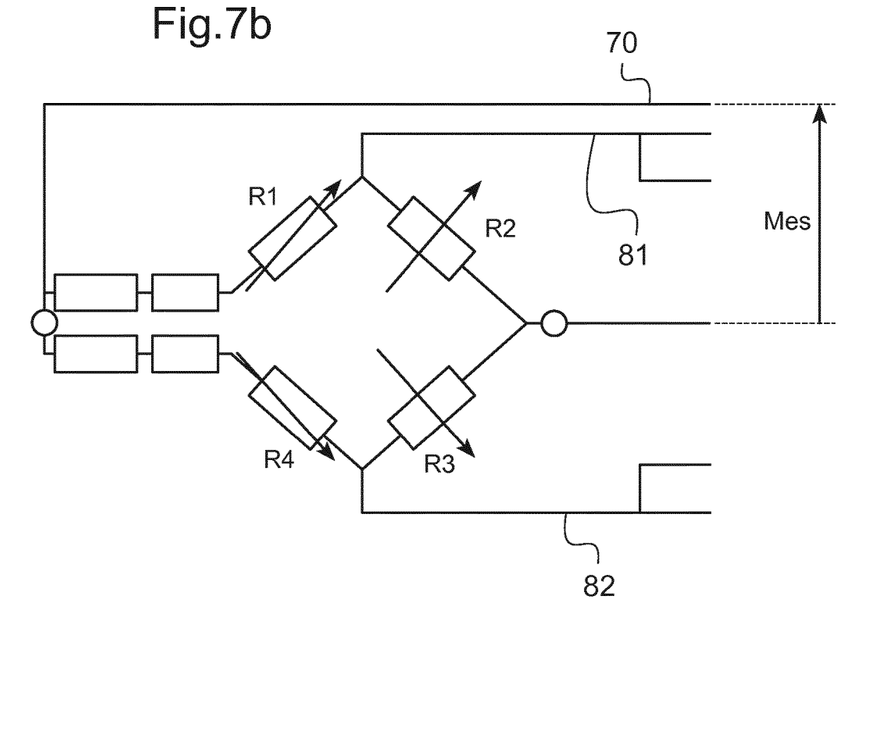
FIG. 7b is a view similar to FIG. 6b in which are shown variations of resistance because of the effect of flexing caused by an advance force.

This wiring therefore makes it possible to limit the influence on the measurement of the tangential cutting force of the flexing exerted on the insert holder linked to the advance force.

Figure 8A:
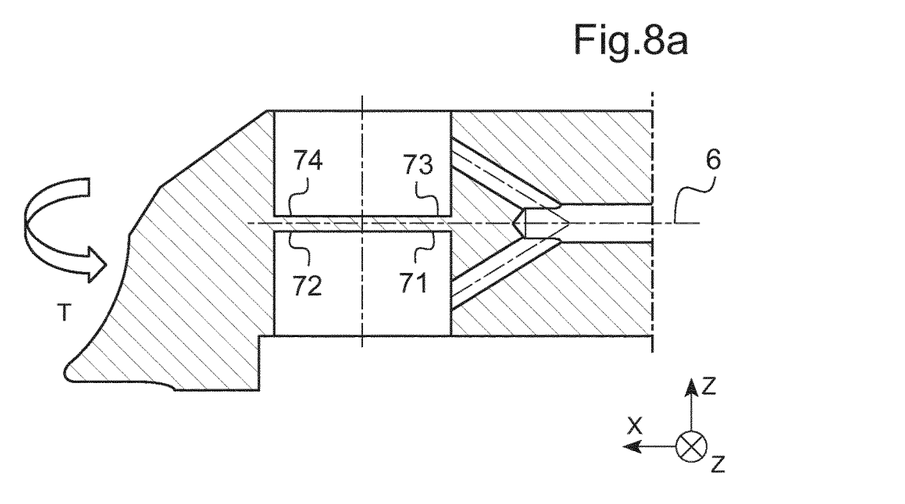
FIG. 8a is a view similar to FIG. 6a showing the direction of a torsion force exerted on the insert holder body, the torsion force being linked to the application of the tangential cutting force at a point far from the neutral fiber.

Shown in FIG. 8a is the torsion force T that may be exerted on the insert holder 1 around the neutral fiber 6 simultaneously with the tangential cutting force.

The strain gages 72 and 73 arranged diagonally in the measurement cavities 4, 5 are deformed in extension, increasing the resistances R2 and R3, respectively. The strain gages 71 and 74 arranged diagonally in the measurement cavities 4, 5 are deformed in compression, reducing by a similar amount the resistances R1 and R4, respectively (see FIG. 8b). Thus the relation R1\*R3=R2\*R4 substantially remains applicable. Consequently, the deformation of the insert holder linked to the torsion of the insert holder hardly imbalances the Wheatstone bridge at all.

Figure 8B:
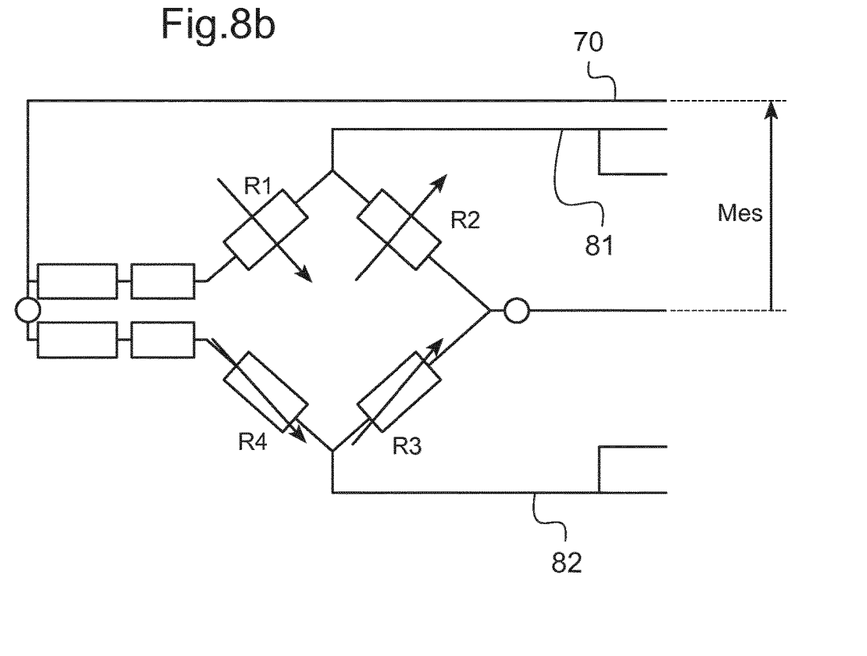
FIG. 8b is a view similar to FIG. 6b in which are shown variations of resistance because of the effect of a torsion force.

This wiring therefore makes it possible to limit the influence on the measurement of the tangential cutting force of the torsion force exerted on the insert holder.

Figure 9A:
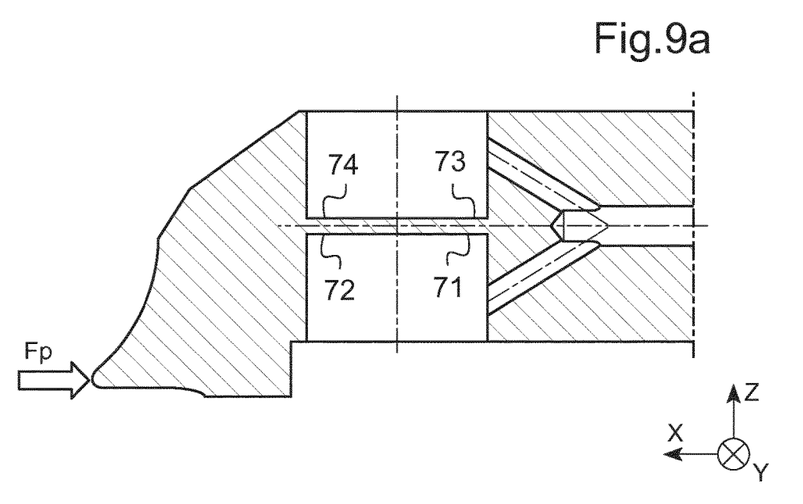
FIG. 9a is a view similar to FIG. 6a showing the direction of a penetration force exerted on the insert holder body.

Shown in FIG. 9a is the penetration force Fp that may be exerted on the insert holder 1 simultaneously with the tangential cutting force. The penetration force Fp applies a longitudinal thrust to the cutting insert 3.

Figure 9B:
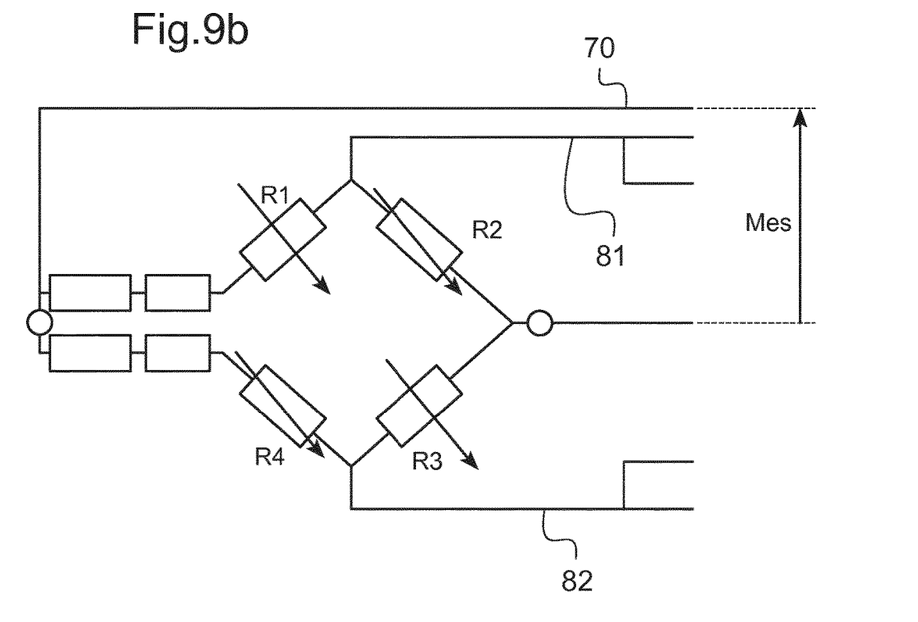
FIG. 9b is a view similar to FIG. 6b showing the direction of variation of resistance of the strain gages because of the effect of a penetration force.

The four strain gages 71, 72, 73 and 74 are deformed in compression, increasing the four resistances R1, R2, R3 and R4, respectively, by a similar amount (see FIG. 9b). Thus the relation R1\*R3=R2\*R4 substantially remains applicable. Consequently, the deformation of the insert holder linked to the torsion force of the insert holder hardly imbalances the Wheatstone bridge at all. This wiring therefore makes it possible to limit the influence on the measurement of the tangential cutting force of the penetration force exerted on the insert holder.

The same insert holder may be used to measure the tangential cutting force of all exterior turning operations (plain turning, facing, contour milling, thread-cutting, grooves/parting off or multidirectional turning operations for grooves or plain turning) or interior turning operations (boring, interior contour milling, thread-cutting or grooves), the direction of the component of the tangential cutting force of the insert holder (or main cutting force) always being orthogonal to the plane defined by the cutting insert.

Figure 10:
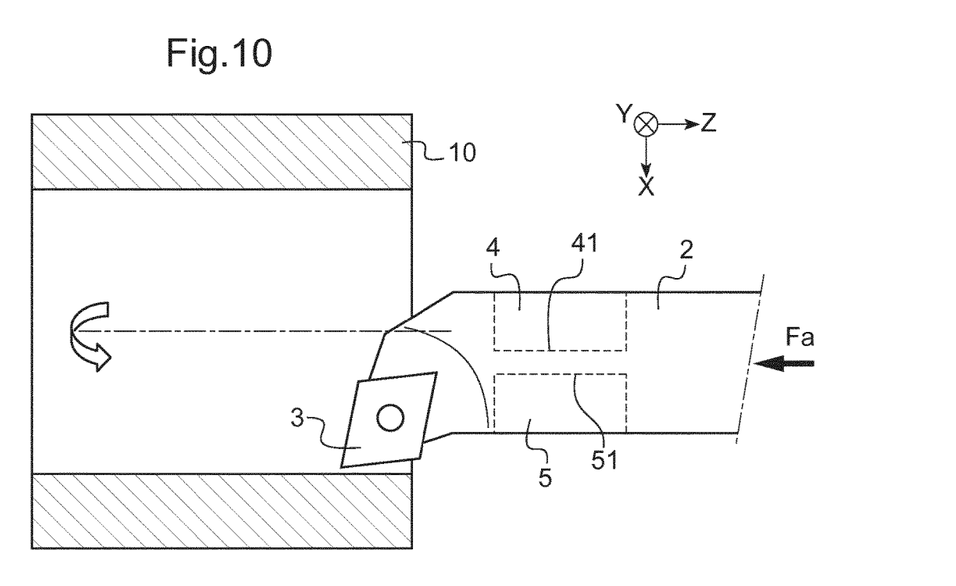
FIG. 10 shows an example of an insert holder and a part to be machined by interior turning with the axis Z parallel to the direction of the component of the insert holder advance force.

Thus shown in FIG. 10 is an example of an insert holder and a part to be machined by interior turning.

The flat bottoms 41, 51 of the measurement cavities 4, 5 are parallel to the direction Y of the component of the tangential cutting force of the insert holder to be measured and parallel to the longitudinal direction Z of the insert holder body 2.

Figure 11:
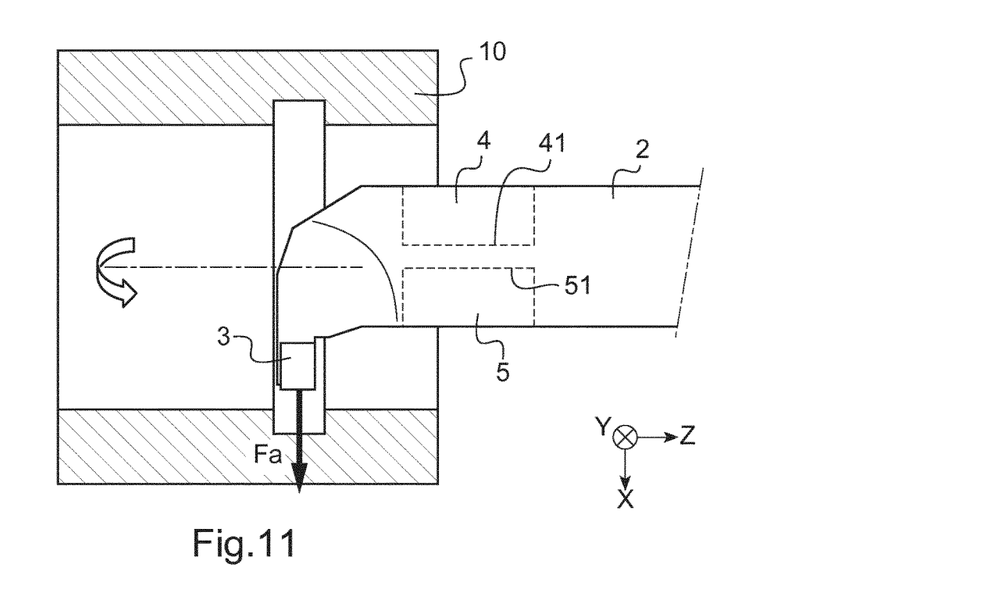
FIG. 11 shows another example of an insert holder and a part to be machined by interior turning with the axis Z perpendicular to the direction of the component of the insert holder advance force.

FIG. 11 shows another example of an insert holder and a part to be machined by interior turning.

The flat bottoms 41, 51 of the measurement cavities 4, 5 are parallel to the direction Y of the component of the tangential cutting force of the insert holder to be measured and parallel to the longitudinal direction Z of the insert holder body 2.

Figure 2:
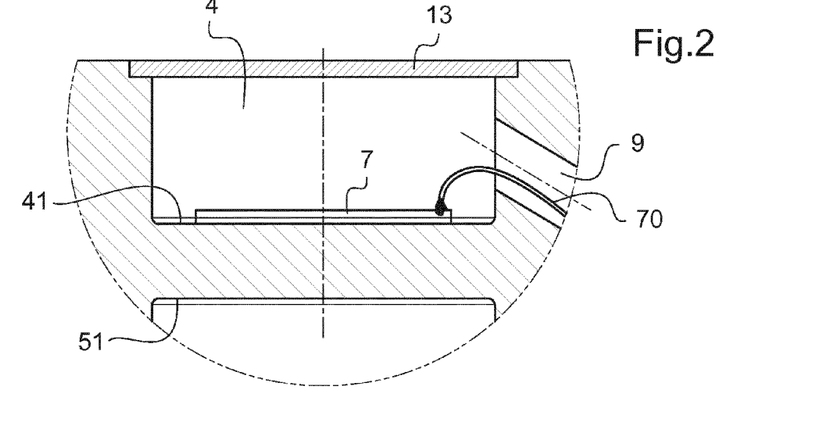
FIG. 2 is a diagrammatic view of a detail of the insert holder from FIG. 1.

The insert holder may further include closure plates 13 for closing and sealing the measurement cavities 4, 5 and the wiring cavity 10 (see FIGS. 1 and 2). The closure plates 13 enable protection of the strain gages, notably from splashing oil and chips.

The closure plates 13 are oblong or circular, for example, depending on the shape of the measurement cavity opening. The thickness of the closure plates 13 is less than 1 millimeter, such as of the order of 3/10 mm, to preserve the flexibility of the insert holder enabling measurements of good sensitivity to be obtained.

The closure plates 13 are welded to the insert holder body 2, for example, around openings of the measurement cavities 4, 5 and the wiring cavity 10. The welding is effected by transparency using a laser beam, for example. By welding "by transparency" is meant welding the closure plate 13 arranged in a shoulder of the insert holder body 2 around the opening by welding through the closure plate 13. Stainless steel of the 1.4542 (17-4 PH) type is preferably used. Laser welding notably makes it possible to produce perfectly sealed joints.

Figure 12A:
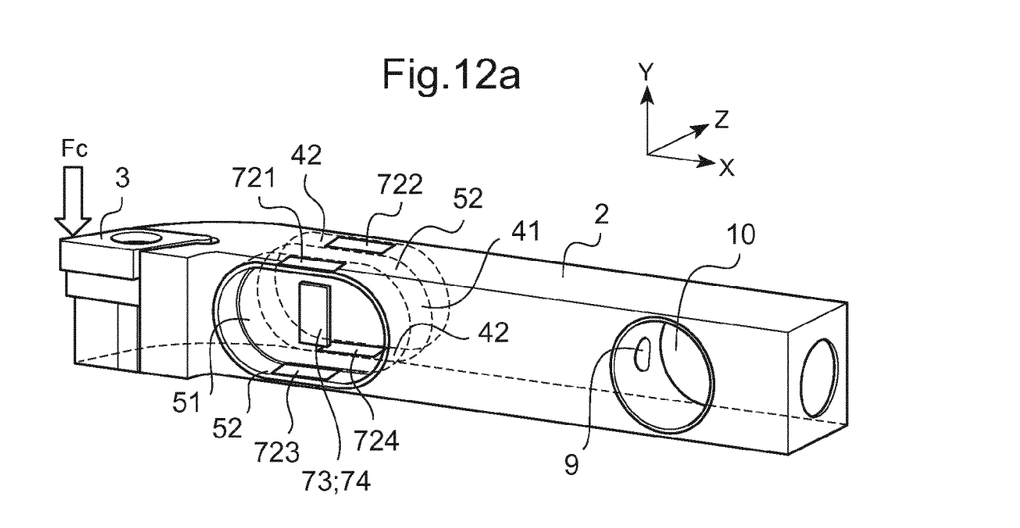
FIG. 12a is a perspective side view of a second embodiment of an insert holder.

In accordance with a second embodiment, the insert holder body 2 also has at least one plane lateral wall 42, 52 perpendicular to the vertical direction Y of the component of the cutting force of the insert holder. The insert holder 1 further includes at least one second strain gage 721, 722, 723, 724 configured to measure the deformation of at least one plane lateral wall 42, 52.

In plain turning, the plane lateral wall 42, 52 is parallel to the component of the insert holder advance force so that measuring the deformations of these walls therefore enables measurement of an advance force independently of the measurement of the tangential cutting force.

The plane lateral walls 42, 52 are formed in lateral walls of the measurement cavities 4, 5, for example. Two measurement cavities are therefore necessary rather than four.

The measurement cavities 4, 5 then have a parallelepiped shape with rounded or oblong ends, for example, so that each measurement cavity 4, 5 includes both a flat bottom 41, 51 parallel to the vertical direction Y of the component of the tangential cutting force of the insert holder to be measured and two plane lateral walls 42, 52 perpendicular to the vertical direction Y of the component of the cutting force of the insert holder to be measured.

As shown in FIG. 12a, for example, the insert holder 1 includes two measurement cavities of oblong shape. The elongate lateral walls of the oblong measurement cavities 4, 5 include two facing plane lateral walls 42, 52 perpendicular to the vertical direction Y of the component of the cutting force.

Each measurement cavity 4, 5 includes at least one first strain gage, such as a double Christmas tree gage 71, 72, for the measurement of the deformations in shear of the flat bottoms 41, 51, and at least one second strain gage 721, 722, 723 and 724, for the measurement of the plane lateral walls 42, 52.

The second strain gages 721, 722, 723 and 724 are conventional extension strain gages, for example.

Each measurement cavity 4, 5 includes two first strain gages 721, 722, 723 and 724 stuck to a respective plane lateral wall 42, 52, for example (see FIG. 12a).

Figure 12B:
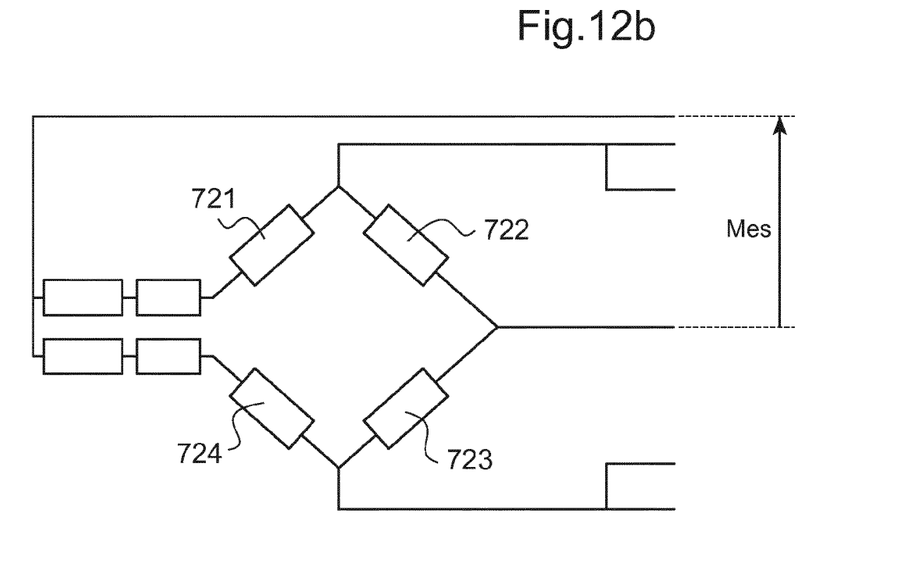
FIG. 12b shows an example of the wiring of the second strain gages.

The four second strain gages 721, 722, 723 and 724 are connected in a complete Wheatstone bridge (see FIGS. 12a and 12b).

The second strain gages 721, 723 connected in opposite branches of the Wheatstone bridge are arranged in the first measurement cavity 5, facing each other in the vertical direction Y of the component of the tangential cutting force of the insert holder. Similarly, the second strain gages 722, 724 connected in opposite branches of the Wheatstone bridge are arranged in the second measurement cavity 4, facing each other in the vertical direction Y of the component of the tangential cutting force of the insert holder.

With this particular wiring, it is possible to measure the advance force alone exerted on the insert holder, limiting the influence of the tangential cutting, penetration and torsion forces.

Figure 13A:
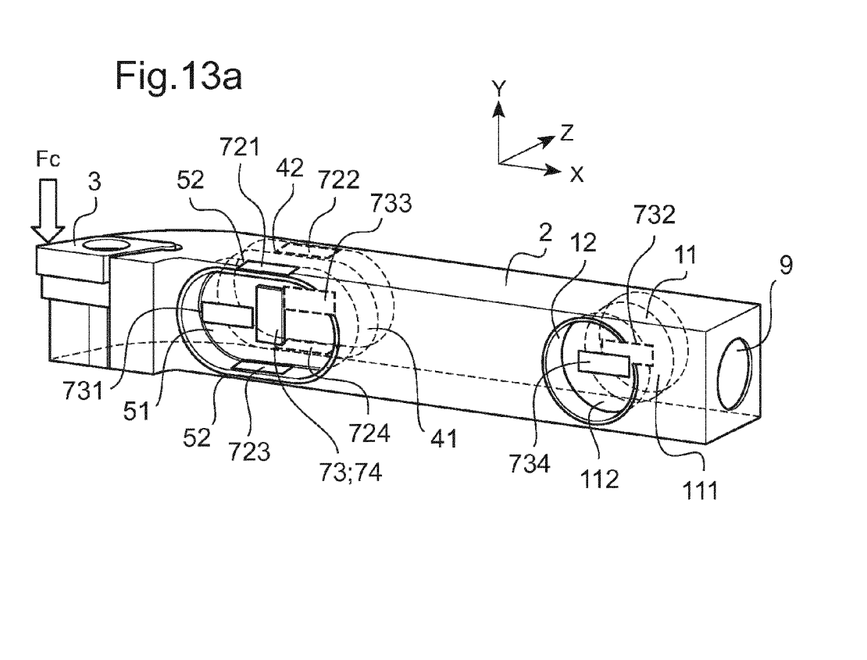
FIG. 13a is a perspective side view of a third embodiment of an insert holder.
Figure 13B:
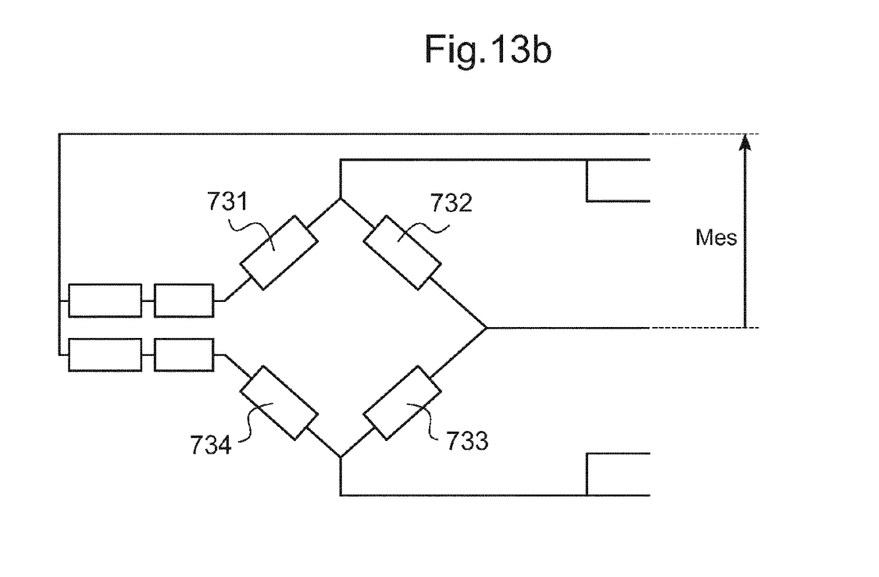
FIG. 13b shows an example of the wiring of the third strain gages.

In accordance with a third embodiment shown in FIGS. 13a, 13b, the insert holder includes two additional measurement cavities 11, 12 formed in the insert holder body 2, having at least one respective flat bottom 111, 112 in the plane (X, Y) parallel to the vertical direction Y of the component of the tangential cutting force of the insert holder 1. The flat bottoms 111, 112 of the additional measurement cavities 11, 12 are aligned and longitudinally offset from the respective flat bottoms 41, 51 of the measurement cavities 4, 5.

The additional measurement cavities 11, 12 are symmetrically arranged relative to the neutral fiber 6 of the insert holder body 2. They are centered on the neutral fiber 6, that is to say they are themselves symmetrically arranged relative to the neutral fiber 6. They have a cylindrical general shape, for example. The axis of the cylindrical additional measurement cavities 11, 12 (or their height) extends in a direction parallel to the rotation axis Z.

The insert holder further includes at least one third deformation sensor 731, 732, 733 and 734 configured to measure the deformation of the flat bottom 41, 51 of at least one measurement cavity 4, 5 and the deformation of the flat bottom 111, 112 of at least one additional measurement cavity 11, 12.

For example, each measurement cavity 4, 5 includes at least one first strain gage, such as a double Christmas tree gage 71, 72, 73, 74 for the measurement of the deformations in shear of the flat bottoms 41, 51 and at least one third strain gage 731 and 733 for the measurement of the deformations in compression/extension of the flat bottoms 41, 51. Each of the additional measurement cavities 11 and 12 includes a third strain gage 732 and 734 for the measurement of the deformations in compression/extension of the flat bottoms 111, 112.

The four third strain gages 731, 732, 733 and 734 are arranged symmetrically relative to the neutral fiber 6. The third strain gages 731, 734 and 732 and 733 are aligned in pairs in the longitudinal direction X of the insert holder (see FIG. 13a).

The third strain gages 731, 732, 733 and 734 are conventional extension strain gages, for example.

In plain turning, it is therefore possible to measure a penetration force independently of the measurement of the tangential cutting force.

The four third strain gages 731, 732, 733 and 734 are connected in a complete Wheatstone bridge, for example (see FIG. 13b).

The third strain gages 731, 733 connected in opposite branches of the Wheatstone bridge are arranged on respective opposite sides of the core of the insert holder body. Similarly, the third strain gages 732, 734 connected in opposite branches of the Wheatstone bridge are arranged on respective opposite sides of the core of the insert holder body.

With this particular wiring, it is possible to measure the penetration force alone exerted on the insert holder, limiting the influence of the tangential cutting, advance and torsion forces.

This therefore extends the possibility of measuring cutting forces to machining operations that require a low cutting power by an astute arrangement and wiring of the strain gages, making it possible to obtain a measurement of the cutting forces that is accurate and independent of the deformations caused by other forces also exerted on the insert holder.

Although the second and third embodiments have been described for a plain turning tool, the insert holders may also be used for other turning operations.

Figure 14:
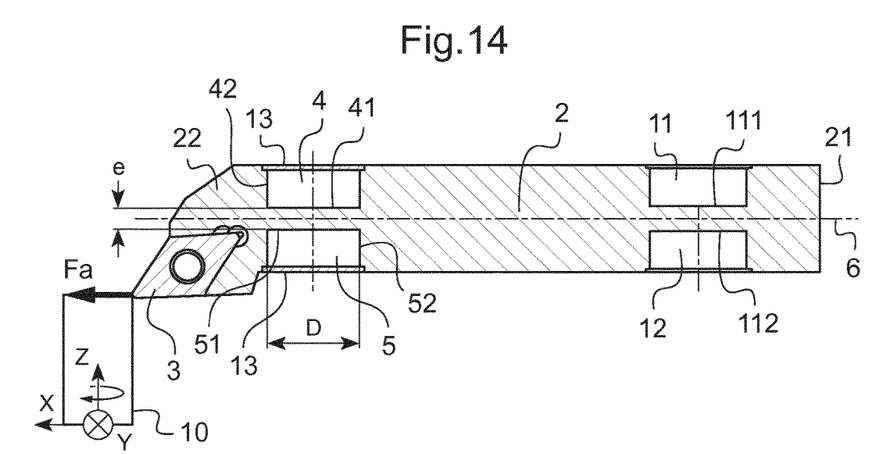
FIG. 14 shows an example of an insert holder and a part to be machined by a facing operation.

The insert holder may be used for facing operations, for example, as shown diagrammatically in FIG. 14.

For facing operations, the plane lateral walls 42, 52 of the measurement cavities 4, 5 parallel to the axis Z then parallel to the direction of the component of the insert holder penetration force make it possible to measure a penetration force independently of the measurement of the tangential cutting force.

Also, in facing, the flat bottoms 111, 112 of the additional measurement cavities 11, 12 parallel to the axis X then parallel to the component of the insert holder advance force make it possible to measure an advance force independently of the measurement of the tangential cutting force.

The invention claimed is:

1. An insert holder for a machine tool turning tool including an insert holder body a head of which is intended to receive a cutting insert, characterized in that at least two measurement cavities are formed in the insert holder body at the head end, said measurement cavities being symmetrically arranged relative to a neutral fiber of the insert holder body and centered on the neutral fiber, each of the measurement cavities having a respective flat bottom parallel to a direction of the component of the tangential cutting force of the insert holder to be measured and parallel to a longitudinal direction of the insert holder body, the insert holder further including at least one first strain gage configured to measure the shear deformation of the flat bottom of at least one of the two measurement cavities.

2. The insert holder as claimed in claim 1, characterized in that a thickness (e) of a core of the insert holder body between the respective flat bottoms of the measurement cavities is between 2 and 10 millimeters and in that a ratio e/D between the thickness e of the core of the insert holder body and the longitudinal dimension D of the measurement cavity is between 0.1 and 0.85.

3. The insert holder as claimed in claim 1, characterized in that a thickness of a core of the insert holder body between the respective flat bottoms of the measurement cavities is between 4 and 8 millimeters and in that the ratio e/D between the thickness e of the core of the insert holder body and a longitudinal dimension D of the measurement cavity is between 0.3 and 0.5.

4. The insert holder as claimed in claim 1, further comprising at least four first strain gages connected in a complete Wheatstone bridge, the first strain gages connected in the opposite branches of the Wheatstone bridge being arranged in a separate measurement cavity and being superposed on respective opposite sides of the core of the insert holder body.

5. The insert holder as claimed in claim 1, characterized in that the first strain gages are associated in pairs to measure the deformation of the flat bottom by forming a double Christmas tree gage for which longitudinal directions of the resistive wires of the respective first two strain gages are arranged in a V shape, said resistive wires being substantially centered relative to the neutral fiber and aligned on the neutral fiber.

6. The insert holder as claimed in claim 1, characterized in that the insert holder body also has at least one plane lateral wall perpendicular to the direction of the component of the cutting force of the insert holder, the insert holder further including at least one second strain gage configured to measure the deformation of at least one plane lateral wall.

7. The insert holder as claimed in claim 6, characterized in that the plane lateral walls are formed in lateral walls of a measurement cavity.

8. The insert holder as claimed in claim 7, further comprising at least four second strain gages connected in a complete Wheatstone bridge, the second strain gages connected in opposite branches of the Wheatstone bridge being arranged facing one another in the direction of the component of the tangential cutting force of the insert holder and configured to measure the plane lateral wall.

9. The insert holder as claimed in claim 1, further comprising:
two additional measurement cavities in the insert holder body having at least one respective flat bottom aligned with and offset longitudinally from the flat bottom of the measurement cavities, and
at least a third deformation sensor configured to measure the deformation of the at least one flat bottom of a measurement cavity and the deformation of at least one flat bottom of an additional measurement cavity.

10. The insert holder as claimed in claim 1, further comprising at least one closure plate for closing and sealing the measurement cavities.

11. The insert holder as claimed in claim 1, characterized in that an internal duct connected to the measurement cavities is formed in the insert holder body for the connecting wires of the strain gage(s), said internal duct opening onto the end of the insert holder body.

12. An insert holder for a machine turning tool comprising:
an insert holder body having a head end configured to receive a cutting insert;
a neutral fiber of the insert holder body;
at least two measurement cavities formed in the head end of the insert holder body, said measurement cavities being symmetrically arranged relative to the neutral fiber of the insert holder body and centered on the neutral fiber, each of the measurement cavities having a respective flat bottom parallel to a direction of a tangential cutting force component of the insert holder to be measured and parallel to a longitudinal direction of the insert holder body; and
at least one strain gage configured to measure a shear deformation of the flat bottom of at least one of two measurement cavities.

13. The insert holder as claimed in claim 12, wherein:
a thickness of a core of the insert holder body between the respective flat bottoms of the measurement cavities is between 2 and 10 millimeters; and
a ratio of the thickness of the core of the insert holder body to a longitudinal dimension of the measurement cavity is between 0.1 and 0.85.

14. The insert holder as claimed in claim 12, wherein:
a thickness of a core of the insert holder body between the respective flat bottoms of the measurement cavities is between 4 and 8 millimeters; and
a ratio of a thickness of the core of the insert holder body to a longitudinal dimension of the measurement cavity is between 0.3 and 0.5.

15. The insert holder as claimed in claim 12, further comprising:
at least four first strain gages connected in a complete Wheatstone bridge, first ones of the strain gages connected in opposite branches of the Wheatstone bridge being arranged in a separate measurement cavity and being superposed on respective opposite sides of a core of the insert holder body.

16. The insert holder as claimed in claim 12, wherein at least some of the at least one strain gages are associated in pairs to measure a deformation of the flat bottom by forming a double Christmas tree gage for which longitudinal directions of resistive wires of two strain gages are arranged in a V shape and the resistive wires are substantially centered relative to the neutral fiber and aligned on the neutral fiber.

17. The insert holder as claimed in claim 12, wherein the insert holder body also has at least one plane lateral wall perpendicular to a direction of a component of a cutting force of the insert holder and the insert holder further comprise at least a second strain gage configured to measure the deformation of at least one plane lateral wall.

18. The insert holder as claimed in claim 17, wherein the plane lateral walls correspond to lateral walls of one of the at least two measurement cavities.

19. The insert holder as claimed in claim 17, further comprising at least four strain gages connected in a complete Wheatstone bridge, with pairs of strain gages connected in opposite branches of the Wheatstone bridge being arranged facing one another in the direction of the component of a tangential cutting force of the insert holder and configured to measure the at least one plane lateral wall.

* * * * *